United States Patent
Jahn et al.

(10) Patent No.: US 10,865,727 B2
(45) Date of Patent: Dec. 15, 2020

(54) DEVICE FOR CONTROLLING AT LEAST ONE SWITCHABLE VALVE

(71) Applicant: Robert Bosch GmbH, Stuttgart (DE)

(72) Inventors: Stephan Jahn, Stuttgart (DE); Juergen Graner, Sersheim (DE); Haris Hamedovic, Moeglingen (DE); Christian Steinbrecher, Boeblingen (DE); Bastian Reineke, Schwieberdingen (DE); Wolfgang Fischer, Gerlingen (DE); Andreas Rupp, Marbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/518,454

(22) PCT Filed: Sep. 24, 2015

(86) PCT No.: PCT/EP2015/071971
§ 371 (c)(1),
(2) Date: Apr. 11, 2017

(87) PCT Pub. No.: WO2016/062493
PCT Pub. Date: Apr. 28, 2016

(65) Prior Publication Data
US 2017/0306879 A1    Oct. 26, 2017

(30) Foreign Application Priority Data

Oct. 21, 2014 (DE) .................... 10 2014 221 273
Sep. 18, 2015 (DE) .................... 10 2015 217 945

(51) Int. Cl.
*F02D 41/20* (2006.01)
*F02D 41/34* (2006.01)
(Continued)

(52) U.S. Cl.
CPC ............. *F02D 41/34* (2013.01); *F02D 41/20* (2013.01); *F02D 41/2438* (2013.01);
(Continued)

(58) Field of Classification Search
CPC .......... F02D 41/34; F02D 41/20; F02D 41/26; F02D 41/2438; F02D 41/2467;
(Continued)

(56) References Cited

U.S. PATENT DOCUMENTS 5,839,412 A * 11/1998 Stockner ................. F02D 41/20
                                                                    123/446
5,975,053 A * 11/1999 Rodier .................... F02D 41/20
                                                                    123/446

(Continued)

FOREIGN PATENT DOCUMENTS

DE    102009000132 A1 *  7/2010 ............. F02D 41/20
DE    102009000132 A1     7/2010
(Continued)

OTHER PUBLICATIONS

International Search Report dated Jan. 5, 2016, of the corresponding International Application PCT/EP2015/071971 filed Sep. 24, 2015.

*Primary Examiner* — Thomas N Moulis
(74) *Attorney, Agent, or Firm* — Norton Rose Fulbright US LLP; Gerard Messina (57) ABSTRACT

A method for controlling at least one switchable valve, a brake impulse that slows down the valve movement being produced during the controlling of the at least one valve. At least one parameter of the brake impulse determines the position and/or the duration of the brake impulse. A parameter is modified, and the reaction of a measurement quantity or of a characteristic feature derived from the measurement quantity is evaluated.

20 Claims, 5 Drawing Sheets

(51) Int. Cl.
*F02D 41/24* (2006.01)
*F02D 41/26* (2006.01)
*G05B 15/02* (2006.01)
*F02M 61/10* (2006.01)

(52) U.S. Cl.
CPC ......... *F02D 41/2467* (2013.01); *F02D 41/26* (2013.01); *G05B 15/02* (2013.01); *F02D 2041/2037* (2013.01); *F02D 2041/2055* (2013.01); *F02D 2041/2058* (2013.01); *F02D 2200/021* (2013.01); *F02D 2200/0406* (2013.01); *F02D 2200/0602* (2013.01); *F02D 2200/0606* (2013.01); *F02D 2200/0618* (2013.01); *F02M 61/10* (2013.01)

(58) Field of Classification Search
CPC ..... F02D 2200/0406; F02D 2200/0602; F02D 2200/0606; F02D 2200/021; F02D 2041/2055; F02D 2041/2037; F02D 2041/2027; F02D 2041/2058; F02D 2200/0618; F02D 2041/2003; F02D 2041/2024; G05B 15/02; F02M 61/10
See application file for complete search history.

(56) References Cited

U.S. PATENT DOCUMENTS

| | | | | |
|---|---|---|---|---|
| 6,176,208 | B1* | 1/2001 | Tsuzuki | F01L 1/462 123/90.11 |
| 6,234,122 | B1* | 5/2001 | Kirschbaum | F01L 9/04 123/90.11 |
| 6,283,073 | B1* | 9/2001 | Izuo | F01L 1/32 123/188.8 |
| 6,785,112 | B2* | 8/2004 | Reischl | F02D 41/20 123/478 |
| 7,013,876 | B1* | 3/2006 | Puckett | F02D 41/20 123/490 |
| 7,014,167 | B2* | 3/2006 | Fuwa | F01L 9/04 123/90.11 |
| 10,197,029 | B2* | 2/2019 | Shimatsu | F02M 51/0614 |
| 2002/0078910 | A1* | 6/2002 | Fuwa | F01L 9/04 123/90.11 |
| 2002/0166541 | A1* | 11/2002 | Yamakado | F02D 41/20 123/490 |
| 2003/0083799 | A1* | 5/2003 | Fuwa | F01L 9/04 701/102 |
| 2009/0126688 | A1* | 5/2009 | Borg | F02M 59/366 123/446 |
| 2009/0179088 | A1* | 7/2009 | Mochizuki | F02D 41/2096 239/584 |
| 2011/0180046 | A1* | 7/2011 | Lehr | F02D 41/2096 123/488 |
| 2011/0288748 | A1 | 11/2011 | Richter et al. | |
| 2012/0000445 | A1* | 1/2012 | Borg | F02D 41/3845 123/497 |
| 2012/0097133 | A1* | 4/2012 | Beer | F02D 41/20 123/490 |
| 2012/0118271 | A1* | 5/2012 | Borg | F02D 41/20 123/495 |
| 2012/0216783 | A1* | 8/2012 | Kusakabe | F02D 41/20 123/490 |
| 2013/0139791 | A1* | 6/2013 | Kusakabe | F02D 41/20 123/478 |
| 2014/0067233 | A1* | 3/2014 | Nishida | F02D 41/20 701/103 |
| 2014/0240886 | A1* | 8/2014 | Itaya | F02D 41/20 361/178 |
| 2015/0040871 | A1* | 2/2015 | Ravenda | F02D 41/20 123/490 |
| 2015/0204286 | A1* | 7/2015 | Prodi | F02M 59/368 123/499 |
| 2015/0226148 | A1* | 8/2015 | Beer | F02D 41/247 123/480 |

FOREIGN PATENT DOCUMENTS

| | | |
|---|---|---|
| DE | 102011085277 A1 | 5/2013 |
| EP | 2386021 A1 | 11/2011 |
| JP | 2001271720 A | 10/2001 |
| JP | 2003003929 A | 1/2003 |
| JP | 2010533820 A | 10/2010 |
| JP | 2015161412 A | 9/2015 |
| WO | 2014139760 A1 | 9/2014 |

* cited by examiner

DEVICE FOR CONTROLLING AT LEAST ONE SWITCHABLE VALVE

BACKGROUND INFORMATION

German Patent Application No. DE 10 2009 000 132 A1 describes a method for controlling at least one switchable valve. There, in the controlling of the at least one valve a brake impulse is produced that slows down the valve movement. The position and/or the length of the brake impulse are specified as a function of a switching time of the valve. The effect on the switching noise here is essentially a function of the position and the duration of the brake impulse.

If the brake impulse does not take place at the right time and with the right duration, it does not deploy its full effectiveness. In the extreme case, it has no effect. Based on changing conditions and/or aging effects at the valve, the time changes at which the switching time occurs. With this the time also changes at which the brake impulse deploys its full effectiveness.

SUMMARY

An method according to the present invention may have the advantage that the noise effect is maintained even as boundary conditions change, such as the voltage at the valve, the fuel pressure, and the temperature.

It is particularly advantageous if in a method for controlling at least one valve in which at least one parameter of the brake impulse determines the position and/or the length of the brake impulse, a parameter of the brake impulse is modified and the reaction of the measurement quantity or of a characteristic feature derived from the measurement quantity is evaluated. Through such an adaptation, it is possible to specify a brake impulse that leads to a very good noise reduction and at the same time does not impair, or impairs only slightly, the behavior of the valve. The slight impairments are easily compensated.

In this procedure it is particularly advantageous if it works with activated brake impulses, and can therefore be used for continuous adaptation. A regular re-parameterization is not necessary, because the parameters are permanently tracked. In this way, the application outlay is also reduced, because characteristic curves or the like do not have to be supplied with data input.

In a particularly advantageous specific embodiment, it is provided that at least one parameter is modified and the curve of the measurement quantity is evaluated. Here it can be provided that the other parameter is held constant or nearly constant. Here, the curve can be plotted and the curve can be evaluated for a characteristic feature.

Alternatively, only the change behavior of the measurement quantity can also be evaluated. That is, it is for example checked whether the measurement quantity increases when there is a change. If this is not the case, the parameter has reached its optimal value. Depending on how the measurement quantity or criterion is defined, some characteristic other than the local maximum can also be used.

It is particularly advantageous if, based on the curve of the measurement quantity, a value for the parameter is selected that is used to control the valve. This means that the parameter is used for further controlling at which the curve of the measurement quantity has the characteristic feature, for example a local maximum.

According to the present invention, the parameter at which the measurement quantity has a local maximum results in an optimal brake impulse. Depending on the design of the valve, a different characteristic feature can also be evaluated. Thus, for example it can also be checked whether the curve of the measurement quantity has a local minimum, an inflection point, and/or a bend.

It is particularly advantageous if the parameter that is changed is the position (IT0, P1) of the brake impulse. However, the procedure is not limited to this. It can also be provided that the duration of the brake impulse is used as the parameter that is changed.

It is particularly advantageous if the measurement quantity is the current flowing through the valve. In the curve of the current, the optimal value for the parameter can be recognized particularly well. However, some other measurement quantity, such as the voltage at the valve, can also be evaluated.

In a simplified specific embodiment, the beginning of the brake impulse is displaced until a switching time of the valve is recognized. Based on the switching time ascertained in this way, the parameters of the brake impulse are then specified. The switching time of the valve is derived from the characteristic feature. This is preferably a feature ascertained from the current curve.

Advantageous developments and improvements of the method are described herein.

In a further aspect, the present invention relates to program code together with processing instructions for creating a computer program that can be executed on a control device, in particular source code having compiler and/or linking instructions, the program code resulting in the computer program for executing all steps of one of the described methods when it is converted into an executable computer program according to the processing instructions, i.e., in particular is compiled and/or linked. This program code can be given in particular by source code, which can be downloaded for example from a server in the Internet.

BRIEF DESCRIPTION OF THE DRAWINGS

Exemplary embodiments of the present invention are shown in the figures and are explained in more detail below.

DETAILED DESCRIPTION OF EXAMPLE EMBODIMENTS

Figure 1:
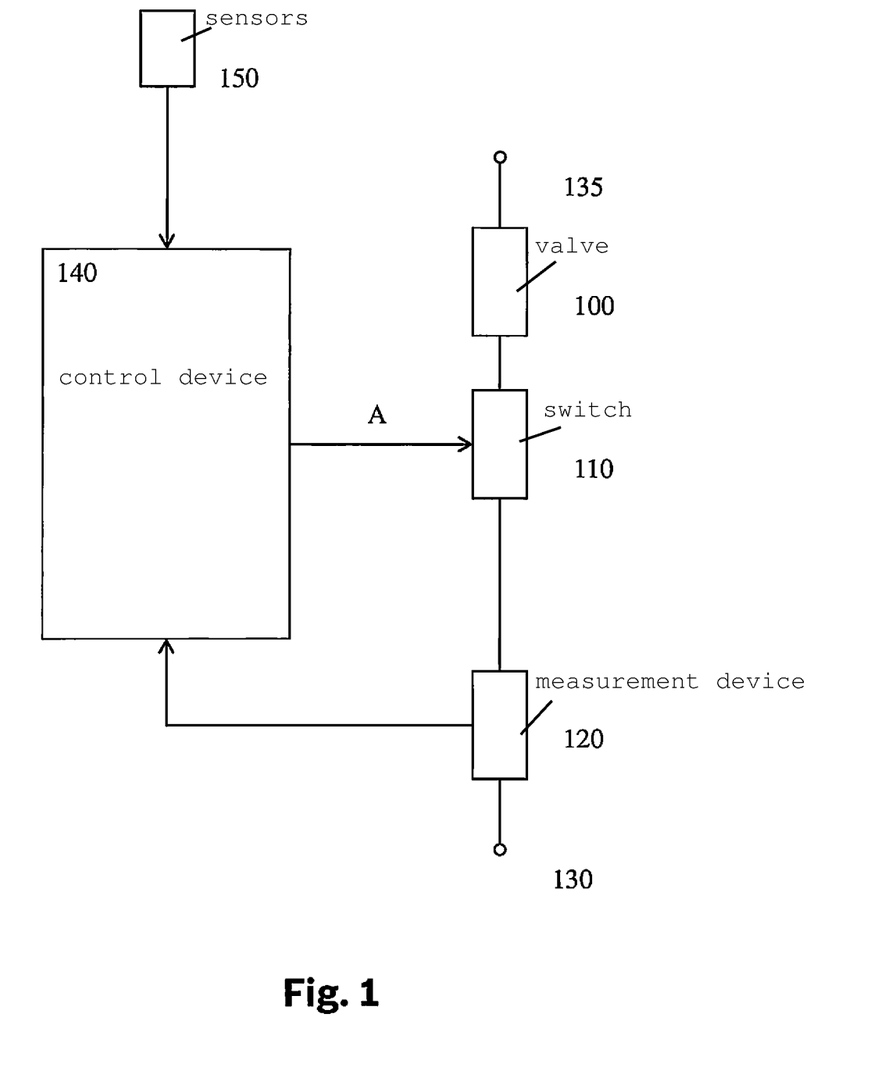
FIG. 1 shows the main elements of a device for controlling a valve.

In FIG. 1, a device is shown for controlling a valve 100. In the depicted specific embodiment, valve 100 is connected in series with a switch 110 and a measurement device 120, between the two terminals 130 and 135 of a power supply. A control device 140 supplies switch 110 with a control signal A. Measurement device 120 supplies control device 140 with a measurement quantity. In addition, sensors 150 are provided that forward sensor signals to control device 140.

The sequence and the number of elements connected in series are shown only as examples. Measurement device 20, switch 110, and valve 100 can also be configured in a different sequence. In addition, it can be provided that a further switch or other circuit elements are provided.

Control device 140 calculates, based on various sensor signals and further quantities present in the control device, a control signal A to be supplied to switch 110. A current flows through valve 100 as a function of the position of switch 110. As a function of the current, a voltage drop arises at the valve. Current measurement device 120 measures in particular the current flowing through valve 100. Alternatively, it can also be provided that the voltage drop at valve 100 is acquired using a suitable measurement device 120.

When the valve is opened or closed due to being supplied with current, switching noises occur. It is known that these switching noises can be significantly reduced by interrupting the controlling during switching on or by a brief re-switching on after switching off. The effect on the switching noise here is a function of the time and the duration of these two so-called brake impulses.

Figure 2:
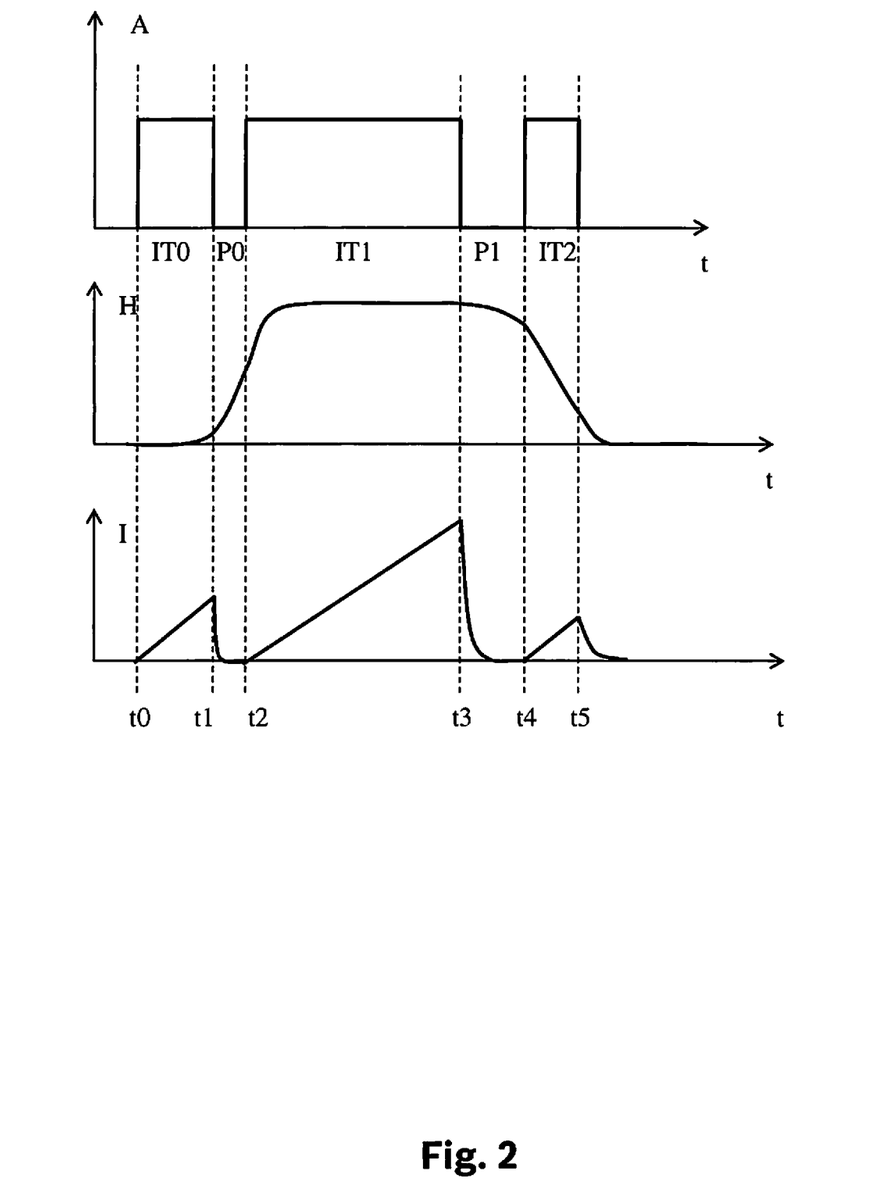
FIG. 2 shows various signals plotted over time.

In FIG. 2a, control signal A is plotted over time t. In FIG. 2b, the stroke H of the valve is plotted, and in FIG. 2c the current I flowing through the valve is plotted. At time t0, the controlling of the valve begins. Starting from this time, control signal A is present at switch 110. Current I through the valve increases with time. At a time t1, control signal A is interrupted, and is switched on again at time t2. This has the consequence that the current drops off between times t1 and t2. This time t1 is chosen such that between times t1 and t2 the valve needle moves in the direction of its new position. At time t3, control signal A is withdrawn in order to end the injection. Starting from time t3, the current decreases and the valve needle moves slowly back to its initial position. At time t4, switch 110 is again controlled, this controlling ending at time t5; i.e., the flow of current is switched on again between times t4 and t5.

The first time duration, between times t0 and t1, in which current is supplied to the valve is designated IT0. The second time duration in which current is supplied to the valve, between times t2 and t3, is designated IT1. The third time duration in which current is supplied to the valves, between times t4 and t5, is designated IT2. In the first pause time P0 between times t1 and t2, the valve is switched off. In the second pause time P1 between times t3 and t4, the valve is also switched off.

Figure 3:
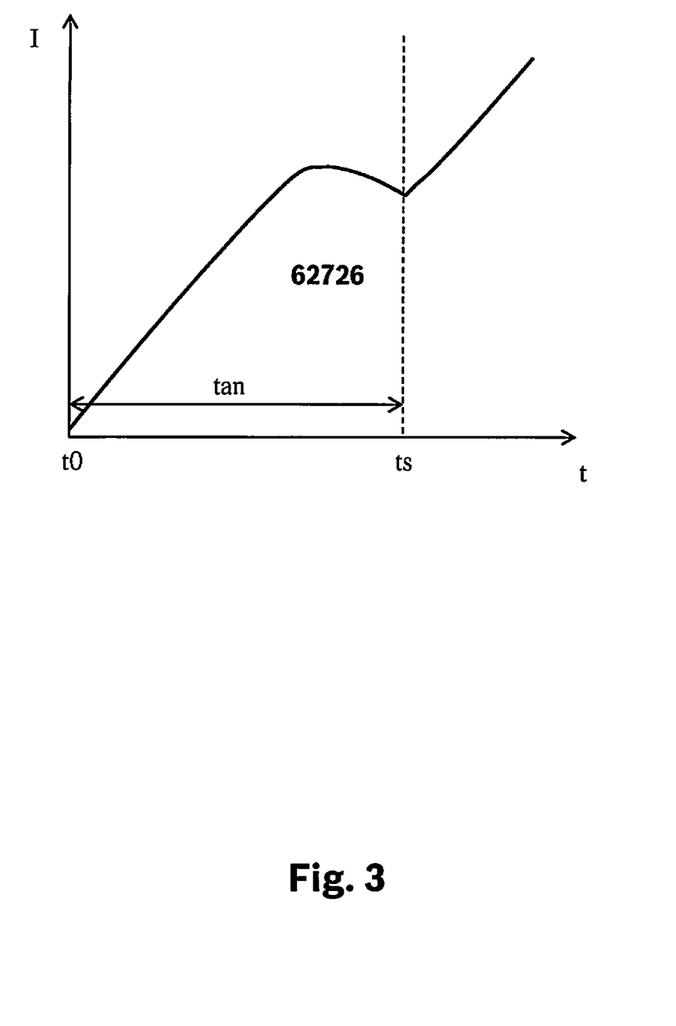
FIG. 3 shows the current curve plotted over time during valve opening.

In FIG. 3 current curve I is plotted over time t. The switch-on process is shown with the beginning of the supply of current. At time t0, the controlling of the flow of current through the valve thus begins. First, the current increases. As soon as the valve needle begins to move, the inductance of the valve changes and the current flow deviates from its previous curve. In the depicted specific embodiment, it is even the case that the current briefly decreases. When the valve needle reaches its stop, the current increase again changes. This happens at time ts. The interval between the beginning of the supply of current at time t0 and this switching time ts is designated opening delay tan. The specific current curve during the opening process differs from magnetic valve to magnetic valve. However, in all magnetic valves there occurs a characteristic feature that indicates the switching time. In the specific embodiment depicted in FIG. 3, the characteristic feature is the bend in the current curve at time ts. In most valves, the current curve has a bend or a similar feature at the switching time. A corresponding feature also occurs at the termination of the controlling. The time duration between the termination of the controlling of the closing of the valve is designated closing delay tab. Here, a corresponding feature can be determined from the curve of the induction voltage of the valve.

Alternatively, the switch-off time can be made visible in the current signal through a suitable circuit. For this purpose, the valve must be supplied with current during the closing time without resulting in a new lifting of the valve needle.

Opening delay tan and closing delay tab of the valve are preferably determined without brake impulse. The opening delay is defined as the time duration from the beginning of the controlling up to the impact of the armature on the inner pole. Here, preferably the characteristic change in the increase in the current is used as the characteristic feature. Closing delay tab is defined from the end of the controlling without brake impulse up to the impact of the needle on the valve seat. It is preferably determined by evaluating the induction voltage during switching off. Here, the change in the increase in the voltage signal is used as the characteristic feature.

The brake impulse during switching on or switching off is determined by two parameters. These are its position and its duration. The position of the brake impulse during switching on corresponds to time t1. This is determined through the time duration IT0 after the beginning of the controlling at time to. The duration of the brake impulse during switching on corresponds to time duration P0 between times t1 and t2.

These two parameters are preferably determined based on the characteristic feature and, possibly, further characteristic quantities. This determination preferably takes place in the control device based on the measurement quantities of measurement value ascertaining 120, based on which opening delay tan is ascertained, and based on the sensor signals of sensors 150. As further characteristic quantities, preferably the voltage, the fuel pressure, the intake manifold pressure, and the temperature are used. As voltage, preferably the supply voltage present between terminals 130 and 135 is used. As pressure, preferably the pressure difference between the fuel pressure and the intake manifold pressure is used. As temperature, various temperature values, such as ambient temperature, engine temperature, or fuel temperature can be used. It would be particularly advantageous to use the valve temperature, which can be ascertained either by a sensor or through a suitable model. Through the use of these characteristic quantities in the specification of the position and the length of the brake impulse, there results a substantial reduction in noise emissions.

According to the present invention, it has been recognized that boundary conditions change. For example, opening delay tan changes during operation of the internal combustion engine, or over time due to age-related defects or changing environmental influences. This has the result that the brake impulse no longer occurs at the optimal time.

Therefore, according to the present invention it is provided that opening delay tan is newly ascertained. Standardly, during operation with brake impulse opening delay tan cannot be ascertained immediately, because the switching time in the control phase occurs during time period P0. This has the result that the characteristic current curve cannot be recognized, and therefore cannot be evaluated.

In the extreme case, the changing boundary conditions can have the result that opening delay tan becomes smaller. This can have the result that the characteristic feature in the current occurs already before time t1, i.e., during the phase IT0. In this case, time duration IT0 is correspondingly reduced. If changing boundary conditions have the result that opening delay tan becomes larger, then the characteristic feature in the current can occur after time t2. In this case, time duration IT0 will correspondingly increase. In these two extreme cases, opening delay tan can be recognized and correspondingly taken into account despite the brake impulse.

In an embodiment of the present invention, it is provided that the brake impulse is continuously displaced; i.e., from injection to injection the brake impulse is displaced to be early or to be late relative to a particular time. This is done until the characteristic feature is recognizable in the current curve. Based on the now-recognized characteristic feature, the opening delay tan or the closing delay tab is determined. If the opening delay tan is ascertained, then in the next controlling of the brake impulse calculation takes place based on this newly calculated opening delay tan. It is particularly advantageous if this measurement of opening delay tan is repeated occasionally in order to ensure an optimal setting of the brake impulse. Here it can be provided that the new measuring is carried out at fixed time intervals, or after a determined driving performance of the vehicle.

In an alternative embodiment, it can also be provided that given a recognized wrong positioning of the brake impulse, a new measurement of opening delay tan is carried out by switching off the brake impulse and ascertaining the characteristic feature.

This means that, based on the measured characteristic feature, a corrected position and/or length of the brake impulse is ascertained.

In an advantageous embodiment, a brake impulse is also specified during the switching off of the valve. The braking impulse during the switching off is defined by the parameters position and duration. The position of the brake impulse during the switching off is defined by time t4, which is defined by the time duration P1 since the end of the controlling at time t3. The duration of the brake impulse at the switching off corresponds to time duration IT2 between times t4 and t5.

The two parameters P1 and IT2, or the position and the duration of the brake impulse, are also set as a function of the closing delay tab as well as further boundary conditions such as voltage, temperature, and pressure. Here as well, the closing delay tab is newly calculated from one time to the next, similar to the case of the opening delay. The procedure during the brake impulse during switching off is analogous to the procedure in the specification of the brake impulse during switching off. The only difference is that during switching off, closing delay tab is used instead of opening delay tan.

In a further specific embodiment of the present invention, it is provided that an adaptation of the parameters of the brake impulse takes place in that the current strength value at a particular time is evaluated. On the basis of the current strength value, a faulty parameterization of the brake impulse is recognized and corrected. For this purpose, the functional dependence of the current strength value on a parameter of the brake impulse is checked for a characteristic feature. The value of the parameter is used at which the current strength value has a characteristic feature. Alternatively, it is provided that the parameter is varied until the current strength value has reached its characteristic feature. Instead of the current strength value, some other measurement value can be used, such as the voltage present at the valve.

Here, it is not necessary to control the valve without a brake impulse. The adaptation of the parameters can be carried out with no, or with only very small, effects on the switching behavior of the valve. In addition, the application is simplified because only one parameter, for example the length IT2 of the brake impulse, has to be determined in the context of the application, and the other parameters are regulated by the adaptation.

In a first embodiment, it is provided that the dependence of the current curve in time interval IT2 as a function of time duration P1, which determines the position of the brake impulse during the switching off of the supply of current, is taken into account.

In a second embodiment, it is provided that the dependence of the current curve in interval IT1 as a function of time duration IT0, which determines the position of the brake impulse during the switching on of the supply of current, is taken into account.

In both embodiments, it is provided that a parameter of the brake impulse is held constant. In these two specific embodiments, this is the duration of the brake impulse. The position of the brake impulse is slowly changed, and the current value is evaluated at a particular time. On the basis of the current strength value, it is recognized whether the optimal position of the brake impulse has been reached. If this is the case, this value is used for the further controlling.

In an embodiment, it can also be provided that the position of the brake impulse is held constant and the duration of the brake impulse is varied.

Figure 4A:
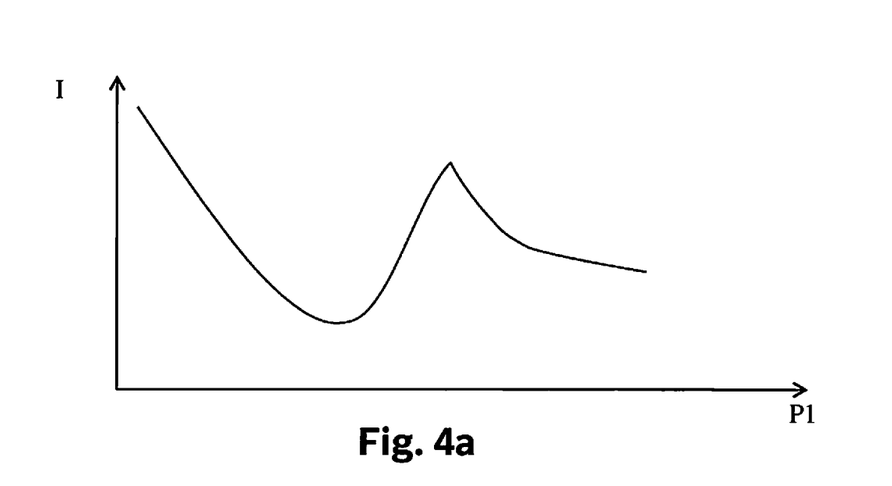
FIG. 4 shows the functional relationship of a current strength value and the speed of the valve needle during valve closing as a function of the position of the brake impulse.

In FIG. 4a, the functional relationship of current strength value I on position P1 of the brake impulse is plotted. As time duration P1, which determines the position of the brake impulse, increases, the current strength value decreases to a local minimum. After the minimum, the current strength value again increases as time duration P1 becomes longer, and then reaches a local maximum. After the local maximum, the current strength value falls off again.

Figure 4B:
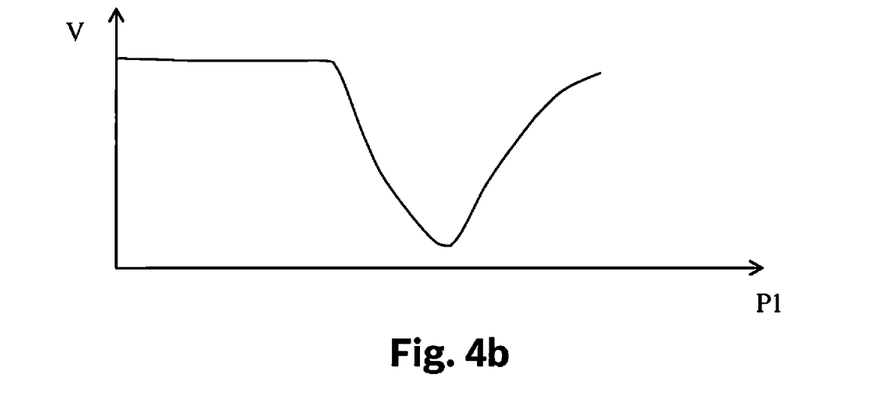

In FIG. 4b, impact speed v of the valve needle is also plotted over the duration of time duration P1. Until the minimum of the current strength value, the speed of the valve needle has a nearly constant value. Afterwards, the speed quickly falls off, and then quickly increases again. The local minimum of the speed is reached at the value for time duration P1 at which the current strength value reaches its local maximum.

According to the present invention, it has been recognized that the value of time duration P1 at which the local maximum of the current strength value is situated corresponds to the optimal position of the brake impulse.

For the adaptation of the brake impulse, a parameter is modified and the curve of the measurement quantity is plotted. Based on the curve of the measurement quantity, a value for the parameter is selected and is used for the controlling of the valve.

In the described exemplary embodiment, the position of the brake impulse is used as parameter and the value of the current at a particular time is used as measurement quantity. Preferably, the value of the current at the end of interval IT2 is used. Preferably, the value of the current immediately before time t5 is used.

Figure 5:
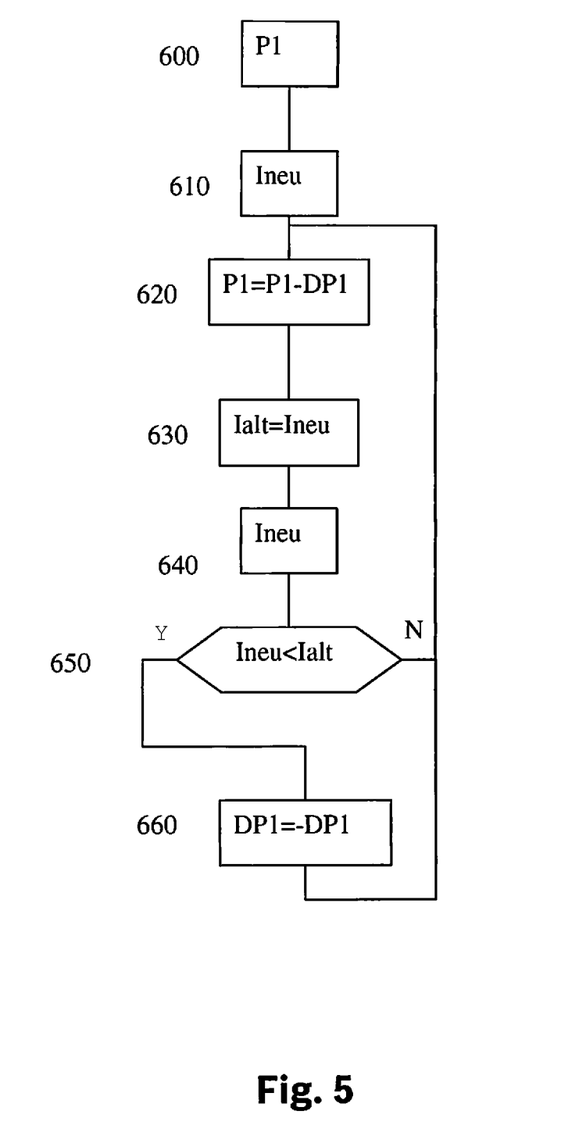
FIG. 5 shows a flow diagram of a specific embodiment of the method according to the present invention.

A procedure such as that shown in FIG. 5 can for example be used to ascertain the value of time duration P1 at which the local maximum of the current strength value.

In a first step 600, a start value is specified for the quantity P1. Following this, in step 610 the current strength value Ineu is ascertained. In the subsequent step 620, quantity P1 is reduced by a small value DP1. In the subsequent step 630, the previous current strength value Ineu is stored as older current strength value Ialt. In the following step 640, the current value Ineu of the current strength is acquired. The following query 650 checks whether the new current strength value Ineu is smaller than the old current strength value Ialt. If this is not the case, then step 620 is repeated. If this is the case, then in step 660 the value DP1 is changed by the value P1 multiplied by −1. Step 620 then likewise follows.

This means that starting from a relatively large value for the quantity P1, this value is reduced in small steps until the current strength value drops off. If a drop of the current strength value is recognized as quantity P1 gets smaller, then quantity P1 is made larger. This also takes place until a dropoff in the current strength value is recognized. That is, the quantity P1 moves in the region of the value at which the local maximum of the current strength value is situated. In an advantageous development, it can be provided that the step width, i.e., quantity P1, is reduced in the vicinity of the local maximum.

The local maximum can also be ascertained using other alternative methods.

A corresponding procedure can be also used in the adaptation of a parameter of the brake impulse during switching on. Here, preferably time duration IT0, which hold fixed the position of the brake impulse, is varied and a current strength value in the time period IT1 is evaluated. Preferably, the time at which the current strength value is acquired is immediately after the beginning of time duration IT1. Preferably, the time is shortly after time t2.

What is claimed is:

1. A method for controlling at least one switchable valve, comprising the following steps:
    producing, during controlling of the valve for each of a plurality of first injections, a brake impulse that slows down a valve movement of the valve, a parameter of the brake impulse determining a position of the brake impulse within a control signal that controls the valve for each of the first injections, wherein the valve movement is a valve opening movement or a valve closing movement;
    wherein during the producing step, the parameter which determines the position of the brake impulse within the control signal is incrementally modified from injection to injection of the first injection to incrementally change the position of the brake impulse within the control signal from injection to injection of the first injections;
    measuring, at or after an end of each of the brake impulses, current flowing through the valve to provide respective measured quantities, each respective measured quantity of the respective measured quantities corresponding to a measurement of the current flowing through the valve at or after a different one of the brake impulses;
    based on a curve formed using the respective measured quantities, determining a modified parameter, the modified parameter determining a modified position, within control signals of the valve for second injections subsequent to the first injections, of a modified brake impulse within the control signals which slows down the valve movement of the valve; and
    producing within the control signals for the second injections, the modified brake impulse at the modified position, using the modified parameter.

2. A non-transitory machine-readable storage medium on which is stored a computer program for controlling at least one switchable valve, the computer program, when executed by a controller, causing the controller to perform the following steps:
    producing, during controlling of the valve for each of a plurality of first injections, a brake impulse that slows down a valve movement of the valve, a parameter of the brake impulse determining a position of the brake impulse within a control signal that controls the valve for each of the first injections, wherein the valve movement is a valve opening movement or a valve closing movement;
    wherein during the producing step, the parameter which determines the position of the brake impulse within the control signal is incrementally modified from injection to injection of the first injection to incrementally change the position of the brake impulse within the control signal from injection to injection of the first injections;
    measuring, at or after an end of each of the brake impulses, current flowing through the valve to provide respective measured quantities, each respective measured quantity of the respective measured quantities corresponding to a measurement of the current flowing through the valve at or after a different one of the brake impulses;
    based on a curve formed using the respective measured quantities, determining a modified parameter, the modified parameter determining a modified position, within control signals of the valve for second injections subsequent to the first injections, of a modified brake impulse within the control signals which slows down the valve movement of the valve; and
    producing within the control signals for the second injections, the modified brake impulse at the modified position, using the modified parameter.

3. A control device designed to control at least one switchable valve, the control device configured to:
    produce, during controlling of the valve for each of a plurality of first injections, a brake impulse that slows down a valve movement of the valve, a parameter of the brake impulse determining a position of the brake impulse within a control signal that controls the valve for each of the first injections, wherein the valve movement is a valve opening movement or a valve closing movement;
    wherein during the producing, the parameter which determines the position of the brake impulse within the control signal is incrementally modified from injection to injection of the first injection to incrementally change the position of the brake impulse within the control signal from injection to injection of the first injections;
    measure, at or after an end of each of the brake impulses, current flowing through the valve to provide respective measured quantities, each respective measured quantity of the respective measured quantities corresponding to a measurement of the current flowing through the valve at or after a different one of the brake impulses;
    based on a curve formed using the respective measured quantities, determine a modified parameter, the modified parameter determining a modified position, within control signals of the valve for second injections subsequent to the first injections, of a modified brake impulse within the control signals which slows down the valve movement of the valve; and
    produce within the control signals for the second injections, the modified brake impulse at the modified position, using the modified parameter.

4. A method for controlling at least one switchable valve, comprising the following steps:
    producing, during controlling of the valve for each of a plurality of first injections, a brake impulse that slows down a valve closing movement of the valve, a parameter of the brake impulse determining a position of the brake impulse within a control signal that controls the valve for each of the first injections;

wherein during the producing step, the parameter which determines the position of the brake impulse within the control signal is incrementally modified from injection to injection of the first injections to incrementally change the position of the brake impulse with the control signal from injection to injection of the first injections;

measuring, at an end of each of the brake impulses, current flowing through the valve to provide respective measured quantities, each respective measured quantity of the respective measured quantities corresponding to a measurement of the current flowing through the valve at or after a different one of the brake impulses;

based on a curve formed using the respective measured quantities, determining a modified parameter, the modified parameter determining a modified position, within control signals of the valve for second injections subsequent to the first injections, of a modified brake impulse within the control signals which slows down the valve closing movement of the valve; and producing within the control signals for the second injections, the modified brake impulse at the modified position, using the modified parameter.

5. The method as recited in claim 4, wherein a local maximum of the curve formed using the respective measured quantities is used to determine the modified parameter.

6. The method as recited in claim 5, wherein the curve is a curve of the respective measured quantities versus corresponding brake impulse positions, a value of the parameter which determined the position of a specific one of the brake impulses within the control signal is used as the modified parameter, the specific one of the brake impulses being the brake impulse which corresponds to the local maximum of the curve formed using all of the respective measured quantities.

7. The method as recited in claim 4, wherein the modified brake impulse is modified in terms of its position with the control signals.

8. The method as recited in claim 1, wherein the valve movement is the valve opening movement, and wherein a local minimum of the curve formed using all of the respective measured quantities is used to determine the modified parameter.

9. The method as recited in claim 1, wherein the valve movement is the valve closing movement, and wherein a local maximum of the curve formed using all of the respective measured quantities is used to determine the modified parameter.

10. The method as recited in claim 8, wherein a value of the parameter which determined the position of a specific one of the brake impulses within the control signal is used as the modified parameter, the specific one of the brake impulses being the brake impulse which corresponds to the local minimum of the curve formed using the respective measured quantities.

11. The method as recited in claim 1, wherein the modified brake impulse is modified in terms of its position within the control signals.

12. The non-transitory machine-readable storage medium as recited in claim 2, wherein the valve movement is the valve opening movement, and wherein a local minimum of the curve formed using the respective measured quantities is used to determine the modified parameter.

13. The non-transitory machine-readable storage medium as recited in claim 2, wherein the valve movement is the valve closing movement, and wherein a local maximum of the curve formed using the respective measured quantities is used to determine the modified parameter.

14. The non-transitory machine-readable storage medium as recited in claim 12, wherein a value of the parameter which determined the position of a specific one of the brake impulses within the control signal is used as the modified parameter, the specific one of the brake impulses being the brake impulse which corresponds to the local minimum of the curve formed using the respective measured quantities.

15. The non-transitory machine-readable storage medium as recited in claim 2, wherein the modified brake impulse is modified in terms of its position within the control signals.

16. The control device as recited in claim 3, wherein the valve movement is the valve opening movement, and wherein a local minimum of the curve formed using the respective measured quantities is used to determine the modified parameter.

17. The control device as recited in claim 3, wherein the valve movement is the valve closing movement, and wherein a local maximum of the curve formed using the respective measured quantities is used to determine the modified parameter.

18. The control device as recited in claim 16, wherein a value of the parameter which determined the position of a specific one of the brake impulses within the control signal is used as the modified parameter, the specific one of the brake impulses being the brake impulse which corresponds to the local minimum of the curve formed using all of the respective measured quantities.

19. The control device as recited in claim 3, wherein the modified brake impulse is modified in terms of its position within the control signals.

20. The method as recited in claim 4, wherein the curve is a curve of the respective measured quantities versus corresponding brake impulse positions, and the modified parameter has a value that is the same as a specific one of the corresponding brake impulse positions that corresponds to the local maximum of the curve.

\* \* \* \* \*